J. A. COZAD.
Hay-Loaders.

No. 157,582. Patented Dec. 8, 1874.

WITNESSES:
Jas. E. Hutchinson
J. W. Foster

INVENTOR:
John A. Cozad
Edson Bros.
Attorneys

UNITED STATES PATENT OFFICE

JOHN A. COZAD, OF MERCER, PENNSYLVANIA, ASSIGNOR OF ONE-HALF HIS RIGHT TO WILLIAM B. GRAHAM, OF SAME PLACE.

IMPROVEMENT IN HAY-LOADERS.

Specification forming part of Letters Patent No. 157,582, dated December 8, 1874; application filed September 19, 1874.

*To all whom it may concern:*

Be it known that I, JOHN A. COZAD, of Mercer, in the county of Mercer and State of Pennsylvania, have invented a certain new and useful Improvement in Hay-Loaders, of which the following is a full, clear, and exact description, reference being had to the annexed drawing, in which—

Figure 1:
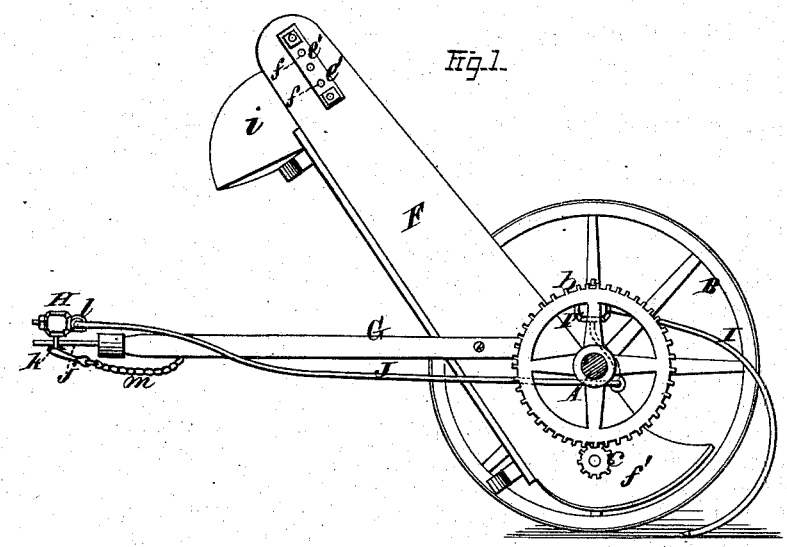
Figure 2:
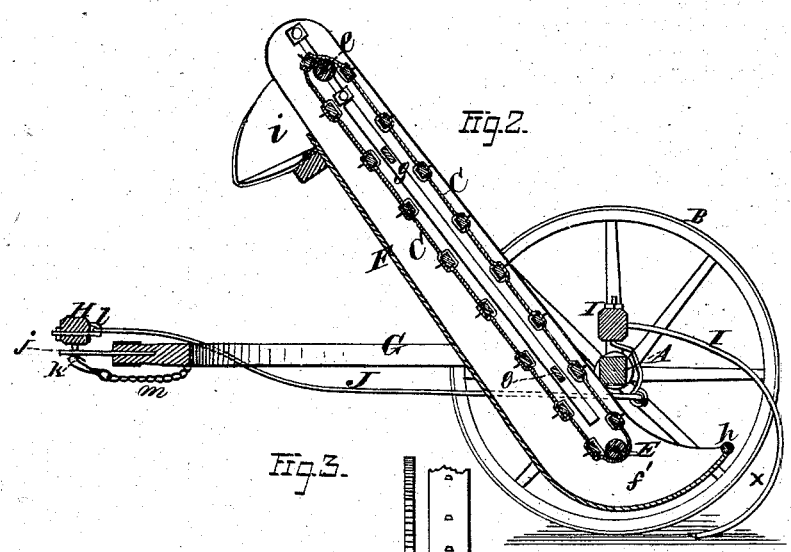
Figure 3:
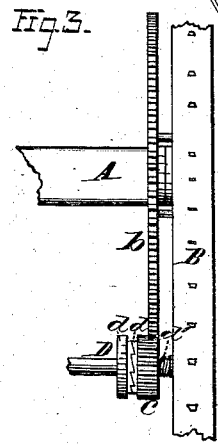

Figure 1 is a side elevation of my loader; Fig. 2, a vertical section; and Fig. 3, a detached enlarged view thereof.

Corresponding parts in the several figures are denoted by like letters.

This invention relates to a certain improvement in hay-loaders; and it consists, first, of the combination, with a rake and endless-toothed apron, of a chute with its lower end extending to the rear of said apron, and curving upwardly between said apron and the rake-teeth, to form a receptacle; secondly, of the combination, with a rake and endless-toothed apron, of a chute with its lower end extending to the rear of said apron, and curving upwardly between said apron and the rake-teeth, to form a receptacle, provided with a feed or friction roll; and, thirdly, of the rake-operating mechanism or lever attached to the wagon-axle, to which is confined a rod or extension of the hounds of the loader, provided with a chain or other medium for its attachment to the wagon, substantially as hereinafter more fully set forth.

In the annexed drawing, A refers to an axle with wheels B B, one of which is provided with a toothed wheel, *b*, gearing with a pinion, *c*, of the clutch *d d* on the axis D of the lower apron drum or roller E, which has its bearings in the sides of the chute F. A spring, *d'*, coiled around the axis D, and interposed between an annular shoulder on its end and the pinion *c*, keeps the parts of the clutch together when the machine moves forward, so as to cause the said axis to revolve and put the endless apron in motion, but which will contract and allow the parts of the clutch to separate when the machine is moved backward, to throw the endless apron out of motion. The endless apron C passes, at its upper end, around a second roller or drum, *e*, journaled in plates *e' e'* in the sides of the chute, having each a series of perforations or holes, *f f*, by which the tension of the apron C may be regulated. Teeth project from transverse pieces or slats in the apron to take up the hay. A frame, *g g*, fastened to the inner sides of the chute, keeps the upper surface or part of the apron C from swagging. F is the chute, having the endless-toothed apron or carrier C, and provided at its lower end with a trough, *f'*, into which to deposit the hay taken up by the rake, and which is provided with a roller, *h*, to assist the rake-teeth in putting the hay into the receptacle, and at its upper end with conductors *i i*, made of angular plates, or of other construction, fastened in any known way to the sides and bottom of the chute, as shown in the two last-mentioned figures, to conduct or direct the elevated hay into the wagon to which the loader is attached. Through this construction the hay is assisted in its ascension, as the chute acts to support and hold it on the apron, it being carried up between the latter and the bottom of the chute. The chute F is secured to and between the hounds G, fastened to the axle A, and provided with a rod, *j*, which enters and is confined in an eye or staple, *k*, of the wagon-axle H, (shown in section,) and detached from the body and wheels of the vehicle. I I are the rake-teeth, pivoted by means of their head upon the axle A above the receptacle *f'*, and extending below the latter, by which a passage, *x*, is formed to direct the collected hay into the said receptacle. J is the lever for operating the rake, having its forward end inserted in an eye or hook, *l*, of the wagon-axle H, by which it will be observed that the movement of the wagon will raise and lower the rake-teeth—the backward movement of the wagon raising them, and its forward movement lowering them. *m* is a chain or other medium, for attaching the hounds of the loader to the wagon-axle.

Having thus described my invention, what I claim, and desire to secure by Letters Patent, is—

1. In a hay-loader, the combination, with a rake and endless-toothed apron, of the chute F, with its lower end extending to the rear of said apron, and curving upwardly between said apron and the rake-teeth to form a receptacle, substantially as shown and described.

2. In a hay-loader, the combination, with a rake and endless-toothed apron, of the chute F, with its lower end extending to the rear of said apron, and curving upwardly between said apron and the rake-teeth to form a receptacle having the feed or friction-roll $h$, substantially as specified.

3. The lever J, in combination with the rake I I, the axle H of the wagon, the hounds G, having the rod $j$, and chain $m$, substantially as and for the purpose set forth.

In testimony whereof I have hereunto signed my name in presence of two subscribing witnesses.

JOHN A. COZAD.

Witnesses:
 EDWARD KENNEDY,
 M. HINKLEY.